United States Patent
Radhakrishnan et al.

(10) Patent No.: US 12,511,443 B2
(45) Date of Patent: Dec. 30, 2025

(54) SYSTEM AND METHOD FOR DATA PROTECTION BASED ON PROXIMITY AND VIEWING ANGLE

(71) Applicant: Bank of America Corporation, Charlotte, NC (US)

(72) Inventors: Prabhu S. Radhakrishnan, Natick, MA (US); Anurajam Rajagopalan, Medavakkam (IN); Subburathinam Krishnan, Tamil Nadu (IN)

(73) Assignee: Bank of America Corporation, Charlotte, NC (US)

( * ) Notice: Subject to any disclaimer, the term of this patent is extended or adjusted under 35 U.S.C. 154(b) by 94 days.

(21) Appl. No.: 18/623,393

(22) Filed: Apr. 1, 2024

(65) Prior Publication Data

US 2025/0307477 A1    Oct. 2, 2025

(51) Int. Cl.
    *G06F 21/00*    (2013.01)
    *G06F 21/84*    (2013.01)
    *G06V 40/16*    (2022.01)

(52) U.S. Cl.
    CPC ............ *G06F 21/84* (2013.01); *G06V 40/161* (2022.01)

(58) Field of Classification Search
    CPC .............................. G06F 21/84; G06V 40/161
    See application file for complete search history.

(56) References Cited

U.S. PATENT DOCUMENTS

| | | | |
|---|---|---|---|
| 7,346,778 B1 | 3/2008 | Guiter et al. | |
| 8,659,433 B2 | 2/2014 | Petrou | |
| 9,275,255 B2 | 3/2016 | Singh et al. | |
| 9,348,984 B2 | 5/2016 | Peled et al. | |
| 9,413,950 B2 * | 8/2016 | Hong | H04N 21/44227 |
| 9,466,266 B2 | 10/2016 | Hildreth et al. | |
| 9,613,217 B2 | 4/2017 | Bostick et al. | |
| 9,684,803 B2 | 6/2017 | Cohen et al. | |
| 9,804,813 B2 | 10/2017 | Fugate | |

(Continued)

FOREIGN PATENT DOCUMENTS

| | | |
|---|---|---|
| CN | 111818863 A | 10/2020 |
| KR | 20190101325 A | 8/2019 |

OTHER PUBLICATIONS

Xin Gong, et al., "Analyzing the effect of temperature on optical performance of dual-layer liquid crystal displays," First published Mar. 5, 2021; https://sid.onlinelibrary.wiley.com/doi/10.1002/jsid.996.

(Continued)

*Primary Examiner* — Kendall Dolly

(57) ABSTRACT

A system for protecting user data from unauthorized users/devices is disclosed. The system detects a triggering event comprising an interaction of a first user with a software application. The system detects a presence of a second user and determines that the second user is not authorized to view the software application. In response, the system activates a set of sensor circuits to determine a set of measurement data comprising a distance between the second user and the computing device and a viewing angle of the second user. The system determines that the distance is less than a threshold distance. The system determines that the viewing angle is less than a threshold angle. In response, the system masks the content associated with the software application when viewed from the determined angle.

20 Claims, 4 Drawing Sheets

(56) References Cited

U.S. PATENT DOCUMENTS

| | | | |
|---|---|---|---|
| 9,983,637 B1 | 5/2018 | Morrison et al. | |
| 10,019,470 B2 | 7/2018 | Birdwell et al. | |
| 10,452,135 B2* | 10/2019 | Files | G06F 3/1431 |
| 10,810,326 B2 | 10/2020 | Wu et al. | |
| 11,347,276 B2 | 5/2022 | Schwager et al. | |
| 11,592,865 B2 | 2/2023 | Moon et al. | |
| 11,770,600 B2* | 9/2023 | O'Leary | H04L 12/1813 |
| | | | 348/14.03 |
| 2012/0331548 A1* | 12/2012 | Tseng | H04M 1/67 |
| | | | 726/19 |
| 2013/0204535 A1* | 8/2013 | Kapoor | G16H 50/50 |
| | | | 702/19 |
| 2013/0311896 A1* | 11/2013 | Singh | G06F 3/013 |
| | | | 715/743 |
| 2015/0106311 A1* | 4/2015 | Birdwell | G06N 3/063 |
| | | | 706/26 |
| 2016/0147492 A1* | 5/2016 | Fugate | G06F 3/1423 |
| | | | 345/633 |
| 2016/0247261 A1* | 8/2016 | Rhodes | G06F 3/013 |
| 2019/0384941 A1* | 12/2019 | Anderson | G06F 21/32 |
| 2020/0111394 A1* | 4/2020 | Rakshit | G09G 5/12 |
| 2022/0129033 A1 | 4/2022 | Schwager et al. | |
| 2023/0281344 A1* | 9/2023 | Speasl | H04L 9/50 |
| | | | 713/176 |
| 2024/0354764 A1* | 10/2024 | Llewelyn | H04M 1/72412 |
| 2025/0013420 A1* | 1/2025 | Lawrence | G06F 3/011 |
| 2025/0181862 A1* | 6/2025 | Llewelyn | H04M 1/72412 |

OTHER PUBLICATIONS

Baixuan Zhao, et al., "Reducing the influence of systematic errors in interference core of stepped micro-mirror imaging fourier transform spectrometer: A novel calibration method," Published Feb. 10, 2023; https://www.mdpi.com/2072-4292/15/4/985.

* cited by examiner

SYSTEM AND METHOD FOR DATA PROTECTION BASED ON PROXIMITY AND VIEWING ANGLE

TECHNICAL FIELD

The present disclosure relates generally to data security, and more specifically to a system and method for data protection based on proximity and viewing angle.

BACKGROUND

When a user accesses a software application on their device, other people may be within a threshold vicinity of the user and be able to view the content displayed on the user's device. The content may include sensitive information that the user does not want to share with others.

SUMMARY

The system described in the present disclosure is particularly integrated into practical applications of improving the data security techniques and functioning of computer systems that are used to display sensitive content associated with a user on a software application. These practical applications and technical advantages derived from them are described further below.

In current systems, when a user accesses the software application on a computing device, other people or devices may be within a threshold vicinity of the computing device and be able to view or otherwise recognize the content being displayed on the display screen of the computing device. In some cases, the user may be in a crowded area and other people may be able to view the content on the display screen of the computing device. In some cases, a person may attempt to view the content displayed on the display screen of the computing device intentionally or unintentionally. In some cases, a device, such as a camera, a mobile device, or a security camera may be within a threshold distance from the computing device such that the content displayed on the display screen of the computing device is viewable or recognizable through the device. Such people and devices may be referred to as peripheral entities who intentionally or unintentionally observe the content on the display screen of the computing device. Thus, the data associated with the user being displayed on the computing device may be exposed to such peripheral entities if they are within a viewing range and angle from the computing device. The current systems do not provide a solution to this and other technical problems.

The disclosed system is configured to provide a solution to this and other technical problems of the current systems. For example, in some embodiments, the system is configured to detect that a peripheral entity is within a threshold distance of the computing device, such as within a viewing range of the display screen. Upon such detection, the system may employ a variety of methods to obscure or alter the content when viewed from the angle from which the peripheral entity is observing the display screen relative to the center line of sight to the display screen. Thus, the system renders the content on the display screen unintelligible to the peripheral entity without affecting the user's ability to view and interact with the software application. For example, the system may utilize a combination of hardware and software components (e.g., sensor circuits, splitting algorithm, and machine learning algorithm) to dynamically adjust the visibility of the content on the display screen based on proximity, light, and viewing angle per viewer (e.g., the user and peripheral entity).

For example, in response to detecting the presence of a peripheral entity and/or that the authorized user is located in a location (e.g., a crowded area) where a probability of other people being within the threshold distance of the computing device is more than a threshold percentage based on a location coordinate of the computing device, the system may prompt the user whether they want to activate a privacy mode. If the system receives user input that indicates to activate the privacy mode, the system may activate the sensor circuits to determine the distance of the peripheral entity from the computing device, the angle from which the peripheral entity is observing the content on the display screen, and the brightness level of the surrounding environment of the user.

In response, the system may determine whether the content on the display screen is recognizable at the determined angle and distance, with the brightness level of the surrounding environment, e.g., based on a predefined training dataset that includes a set of combinations of distances, angles, and brightness levels, each associated with a respective label of mask or unmask indication. If the system determines that the content on the display screen is recognizable at the determined angle and distance, with the brightness level of the surrounding environment, the system, via the splitting algorithm masks or otherwise obscures the content on the display screen when observed at the angle, e.g., without altering the content when viewed from other angles.

In another example, in some embodiments, the system may detect the presence of the peripheral entity by employing an object detection algorithm that is trained and configured to detect devices and people that are within a viewing/observing range from the computing device, where the object detection algorithm, e.g., via a facial recognition algorithm, is configured to distinguish between the authorized user and unauthorized individuals. Thus, the system provides a method that allows the intended user to access the sensitive information displayed by the software application and prevent others from observing the sensitive information displayed by the software application.

In this manner, the system improves the data security techniques by preventing unauthorized users and devices from observing the sensitive information displayed on the software application.

In some embodiments, the system is configured to conserve the processing resources of the computing device. For example, the system is configured to activate the privacy mode in response to the detection of a potential invasion of privacy of the user's data on the computing device. Thus, this selective activation conserves the processing resources by avoiding the continuous operation in the privacy mode. In another example, the system is configured to dynamically allocate processing resources to security (e.g., to the privacy mode) when the user is in a crowded area and reallocate processing resources to other tasks when the user is not in a crowded area. For example, in crowded areas, the data security of the user is given a higher priority than other operations. Thus, the resource allocation utilization is increased and the processing resources are allocated to appropriate tasks based on their priority and the location of the user. In this manner, the system improves the functioning of the computing device by dynamically updating the allocation of the processing resources of the computing device based on the priority of tasks and operations, and the location of the user.

In some embodiments, a system for protecting data associated with a software application from unauthorized users comprises a camera operably coupled with a processor. The camera is configured to capture images of a space in front of a computing device. The processor is associated with the computing device and configured to detect a triggering event, wherein the triggering event comprises an interaction of a first user with a software application on a display screen of the computing device. The processor is further configured to detect a presence of a second user on an image captured by the camera. The processor is further configured to determine that the second user is not authorized to view the software application displayed on the display screen. In response to determining that the second user is not authorized to view the software application displayed on the display screen, the processor is further configured to activate a set of sensor circuits to determine a set of measurement data. Each sensor of the set of sensors is configured to determine the respective measurement data. The set of sensor circuits comprises a distance sensor circuit and an angle sensor circuit. The set of measurement data comprises a distance between the second user and the computing device, and an angle from which the second user is viewing the display screen relative to a center line of sight to the display screen. The processor is further configured to receive the set of measurement data from the set of sensor circuits. The processor is further configured to determine that the distance between the second user and the computing device is less than a threshold distance. The processor is further configured to determine that the angle from which the second user is viewing the display screen relative to the center line of sight to the display screen is less than a threshold angle, wherein the threshold angle is determined such that when the angle between a face of the second user and the display screen is less than the threshold angle, content displayed on the display screen is recognizable by the second user. In response to determining that the distance between the second user and the computing device is less than the threshold distance and that the angle from which the second user is viewing the display screen relative to the center line of sight to the display screen is less than the threshold angle, the processor is further configured to mask the content associated with the software application that is displayed on the display screen when viewed from the determined angle.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to protect data associated with a user from unauthorized users/devices. Embodiments of the present disclosure and its advantages may be understood by referring to FIGS. 1 through 4. FIGS. 1 through 4 are used to describe systems and methods to protect data associated with a user from unauthorized users/devices, according to some embodiments.

System Overview

Figure 1:
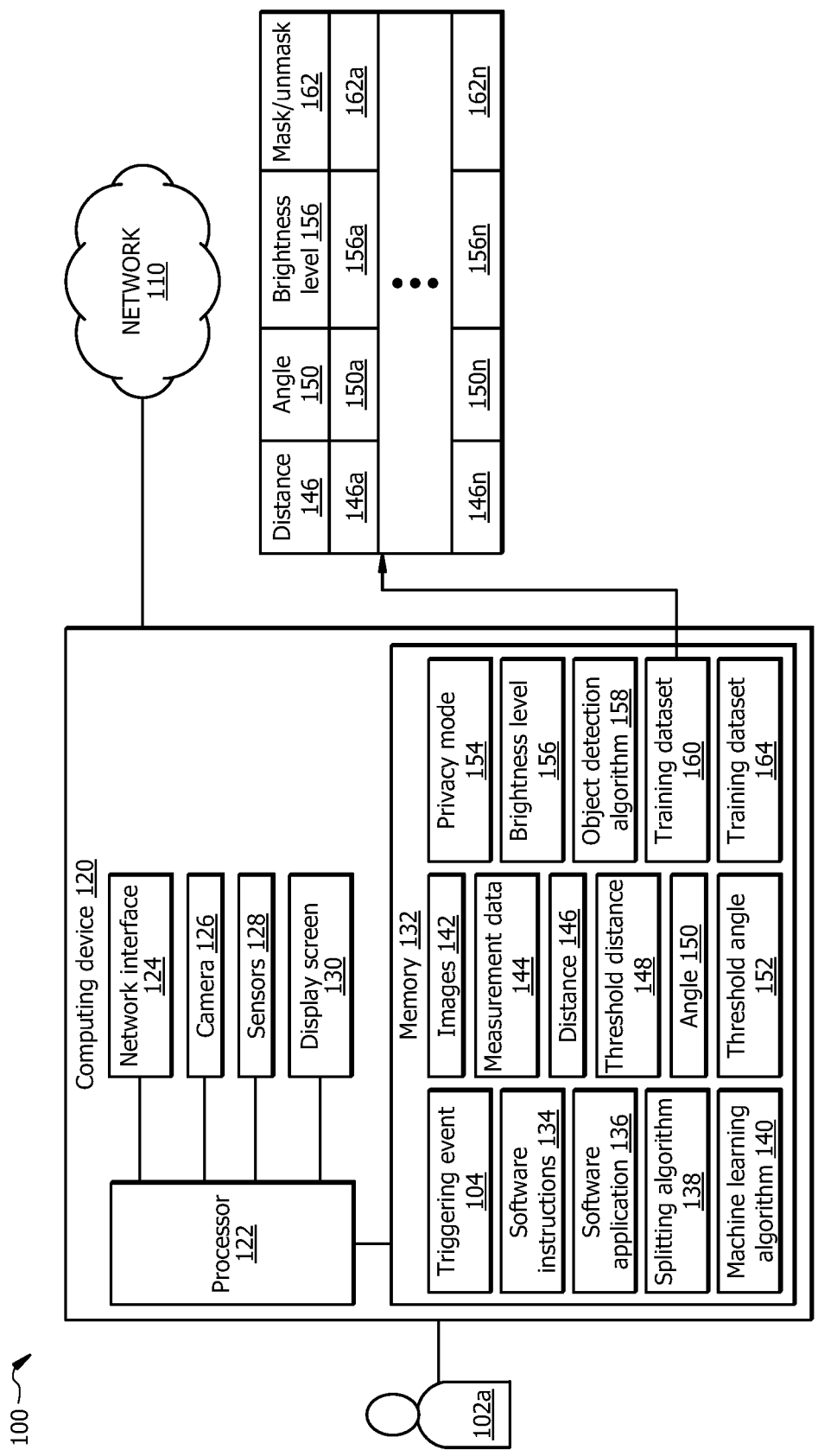
FIG. 1 illustrates an embodiment of a system configured to protect data associated with a user from unauthorized users/devices.

FIG. 1 illustrates an embodiment of a system 100 that is generally configured to protect data associated with a user from unauthorized users/devices by detecting that an unauthorized user/device is within a detection range from a computing device where the data associated with the user is displayed and masking the data from being viewed or recognized from an angle that the unauthorized user/device is viewing the display screen of the computing device. In some embodiments, the system 100 comprises a computing device 120 communicatively coupled with other devices via a network 110. The network 110 enables the communication between the computing device 120 and the other devices, such as servers, desktop computers, mobile phones, laptops, and the like. The computing device 120 may be accessed by the user 102*a* to perform certain tasks, such as accessing their profile via the software application 136, and the like. In other embodiments, system 100 may include other elements instead of, or in addition to, those listed above.

In general, the system 100 provides technical improvements to the current data security techniques. In current systems, when a user 102*a* accesses the software application 136 on the computing device 120, other people or devices may be within a threshold vicinity of the computing device 120 and be able to view or otherwise recognize the content being displayed on the display screen 130 of the computing device 120. In some cases, the user 102*a* may be in a crowded area and other people may be able to view the content on the display screen 130 of the computing device 120. In some cases, a person may attempt to view the content displayed on the display screen 130 of the computing device 120 intentionally or unintentionally. In some cases, a device, such as a camera, a mobile device, a security camera may be within a threshold distance from the computing device 120 such that the content displayed on the display screen 130 of the computing device 120 is viewable or recognizable through the device. Such people and devices may be referred to as peripheral entities (peripheral entities 310*a*, 310*b*) who intentionally or unintentionally observe the content on the display screen 130 of the computing device 120. Thus, the data associated with the user 102*a* being displayed on the computing device 120 may be exposed to such peripheral entities if they are within a viewing range and angle from the computing device 120. The current systems do not provide a solution to this and other technical problems.

The disclosed system 100 is configured to provide a solution to this and other technical problems of the current systems. For example, in some embodiments, the system 100 is configured to detect that a peripheral entity is within a threshold distance 148 of the computing device 120, such as within a viewing range of the display screen 130. Upon such detection, the system 100 may employ a variety of methods to obscure or alter the content when viewed from the angle 150 from which the peripheral entity is observing the display screen 130 relative to the center line of sight to the display screen 130. Thus, the system 100 renders the content on the display screen 130 unintelligible to the peripheral entity without affecting the user 102*a*'s ability to view and interact with the software application 136. For example, the system 100 may utilize a combination of hardware and software components (e.g., sensor circuits 128, software instructions 134, splitting algorithm 138, and machine learning algorithm 140) to dynamically adjust the visibility of the content on the display screen 130 based on proximity, light, and viewing angle per viewer (e.g., the user 102*a* and peripheral entity).

For example, in response to detecting a presence of a peripheral entity and/or that the user 102*a* is located in a location where a probability of other people being within the threshold distance 148 is more than a threshold percentage (e.g., a crowded area) based on a location coordinate of the computing device 120, the system 100 may prompt the user 102*a* whether to activate a privacy mode 154. If the system 100 receives user input that indicates to activate the privacy mode 154, the system 100 may activate the sensor circuits 128 to determine the distance 146 of the peripheral entity from the computing device 120, the angle 150 from which the peripheral entity is observing the content on the display screen 130, and the brightness level 156 of the surrounding environment of the user 102*a* and computing device 120.

In response, the system 100 may determine whether the content on the display screen 130 is recognizable at the determined angle 150 and distance 146, with the brightness level 156 of the surrounding environment, e.g., based on a predefined training dataset 160 that includes a set of combinations of distances 146, angles 150, and brightness levels 156, each associated with a respective label of mask or unmask indication 162. If the system 100 determines that the content on the display screen 130 is recognizable at the determined angle 150 and distance 146, with the brightness level 156 of the surrounding environment, the system 100, via the splitting algorithm 138 to mask or otherwise obscure the content on the display screen 130 when observed at the angle 150, e.g., without altering the content when viewed from other angles.

In another example, in some embodiments, the system 100 may detect the presence of the peripheral entity by employing an object detection algorithm 158 that is trained and configured to detect devices and people that are within a viewing/observing range from the computing device 120, where the object detection algorithm 158, e.g., via a facial recognition algorithm, is configured to distinguish between the authorized user 102*a* and unauthorized individuals and devices. Thus, the system 100 provides a method that allows the intended user 102*a* to access the sensitive information displayed by the software application 136 and prevent others from observing the sensitive information displayed by the software application 136.

In this manner, the system 100 improves the data security techniques by preventing unauthorized users and devices from observing the sensitive information displayed on the software application 136.

In some embodiments, the system 100 is configured to conserve the processing resources of the computing device 120. For example, the system 100 is configured to activate privacy mode 154 in response to the detection of a potential invasion of privacy of the user 102's data on the computing device 120. Thus, this selective activation conserves the processing resources by avoiding the continuous operation in the privacy mode 154. In another example, the system 100 is configured to dynamically allocate processing resources to security (e.g., the privacy mode 154) when the user 102*a* is in a crowded area and reallocate processing resources to other tasks when the user 10*a* is not in a crowded area. For example, in crowded areas, the data security of the user 102*a* is given a higher priority than other operations. Thus, the resource allocation utilization is increased and the processing resources are allocated to appropriate tasks based on their priority and the location of the user 102*a*.

In this manner, the system 100 improves the functioning of the computing device 120 by dynamically updating the allocation of the processing resources of the computing device 120 based on the priority of tasks and operations, and the location of the user 102*a*.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Example Computing Device

Computing device 120 may generally be any device that is configured to process data and interact with users 102. Examples of the computing device 120 include, but are not limited to, a personal computer, a desktop computer, a workstation, a server, a laptop, a tablet computer, a mobile phone (such as a smartphone), smart glasses, Virtual Reality (VR) glasses, a virtual reality device, an augmented reality device, an Internet-of-Things (IoT) device, a kiosk such as an automated teller machine (ATM), or any other suitable type of device. The computing device 120 may include a user interface, such as a display, a microphone, a camera, a keypad, or other appropriate terminal equipment usable by user 102.

The computing device 120 may include a hardware processor, memory, and/or circuitry configured to perform any of the functions or actions of the computing device 120 described herein. For example, the computing device 120 includes a processor 122 in signal communication with a network interface 124, a camera 126, sensor circuits 128, and a memory 132. The memory 132 stores software instructions 134 that when executed by the processor 122 cause the processor 122 to perform one or more operations of the computing device 120 described herein.

Processor 122 comprises one or more processors. The processor 122 is any electronic circuitry, including, but not limited to, state machines, one or more central processing units (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 122 may be a programmable logic device, a microcontroller, a microprocessor, or any suitable number and combination of the preceding. The one or more processors are configured to process data and may be implemented in hardware or software. For example, the processor 122 may be 8-bit, 16-bit, 32-bit, 64-bit, or of any other suitable architecture. The processor 122 may include an arithmetic logic unit (ALU) for performing arithmetic and logic operations. The processor 122 may register the supply operands to the ALU and store the results of ALU operations. The processor 122 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 134) to perform the operations of the computing device 120 described herein. In this way, processor 122 may be a special-purpose computer designed to implement the functions disclosed herein. In an embodiment, the processor 122 is implemented using logic units, FPGAs, ASICs, DSPs, or any other suitable hardware. The processor 122 is configured to operate as described in FIGS. 1-4. For example, the processor 122 may be configured to perform one or more operations of the operational flow 300 as described in FIG. 3 and one or more operations of the method 400 as described in FIG. 4.

Network interface 124 is configured to enable wired and/or wireless communications. The network interface 124 may be configured to communicate data between the computing device 120 and other devices, systems, or domains. For example, the network interface 124 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 122 may be configured to send and receive data using the network interface 124. The network interface 124 may be configured to use any suitable type of communication protocol.

The camera 126 may be or include one or more cameras that are configured to capture images 142 of a field of view in front of the computing device 120 and/or in front of the camera 126. Examples of the camera 126 may include charge-coupled device (CCD) cameras and complementary metal-oxide semiconductor (CMOS) cameras. For example, camera 126 may be configured to capture images 142 the space that is in the field of view of the camera 126. Camera 126 may be configured to capture images continuously, at predetermined intervals, or on-demand. For example, camera 126 may be configured to receive a command from the user to capture an image 142. In another example, camera 126 is configured to continuously capture images to form a video stream. In another example, the camera 126 may be triggered to capture an image 142 of its field of view in response to a detection of user interaction of the user 102*a* with the software application 136 and/or when the user computing device 120 is detected to be located in a crowded area (e.g., an areas with a more than a threshold number of people, such as an airport, a mall, a gathering area, etc.) based on the global positioning system (GPS) location coordinates of the computing device 120. In another example, the camera 126 may capture an image 142 of its field of view when a user 102*a* attempting to access a profile on the software application 136 using the computing device 120. The computing device 120 may use the image of the user 102*a* to perform facial recognition (included in the object detection algorithm 158) to identify and verify the user 102*a*. If the identity of the user 102*a* corresponds to the previously provided and authenticated user 102*a*, the computing device 120 may allow the user 102*a* to log in to the profile on the software application 136. Otherwise, the user 102*a* may not be able to login to the profile on the software application 136. In the same or another example, login credentials may be used to verify whether the user 102*a* is authorized to access the profile on the software application 136.

The sensor circuits 128 may include distance sensor circuit 128, angle sensor circuit 128, and light sensor circuit 128. The distance sensor circuit 128 may include any hardware processing and distance sensing resources and be configured to detect the distance 146 from each person/device that is in a detection range of the distance sensor circuit 128 and the computing device 120. For example, the distance sensor circuit 128 may be configured to utilize one or more technologies, such as ultrasonic, infrared (IR) and/or time-of-flight (ToF) to measure the distance between the computing device 120 and any person or device within the detection range of the distance sensor circuit 128. For example, an ultrasonic distance sensor circuit 128 may emit radio waves that bounce off objects and return to the sensor. The time taken for the radio wave to return is then used to calculate the distance of the object from the computing device 120. The infrared distance sensor circuit 128 may use the reflection of an IR light beam to detect the presence of an object and estimate the distance from the object to the computing device 120. The ToF distance sensor circuit 128 may emit a light beam and measure the time it takes to return after reflecting off the subject, which is then converted into a distance measurement.

Figure 2:
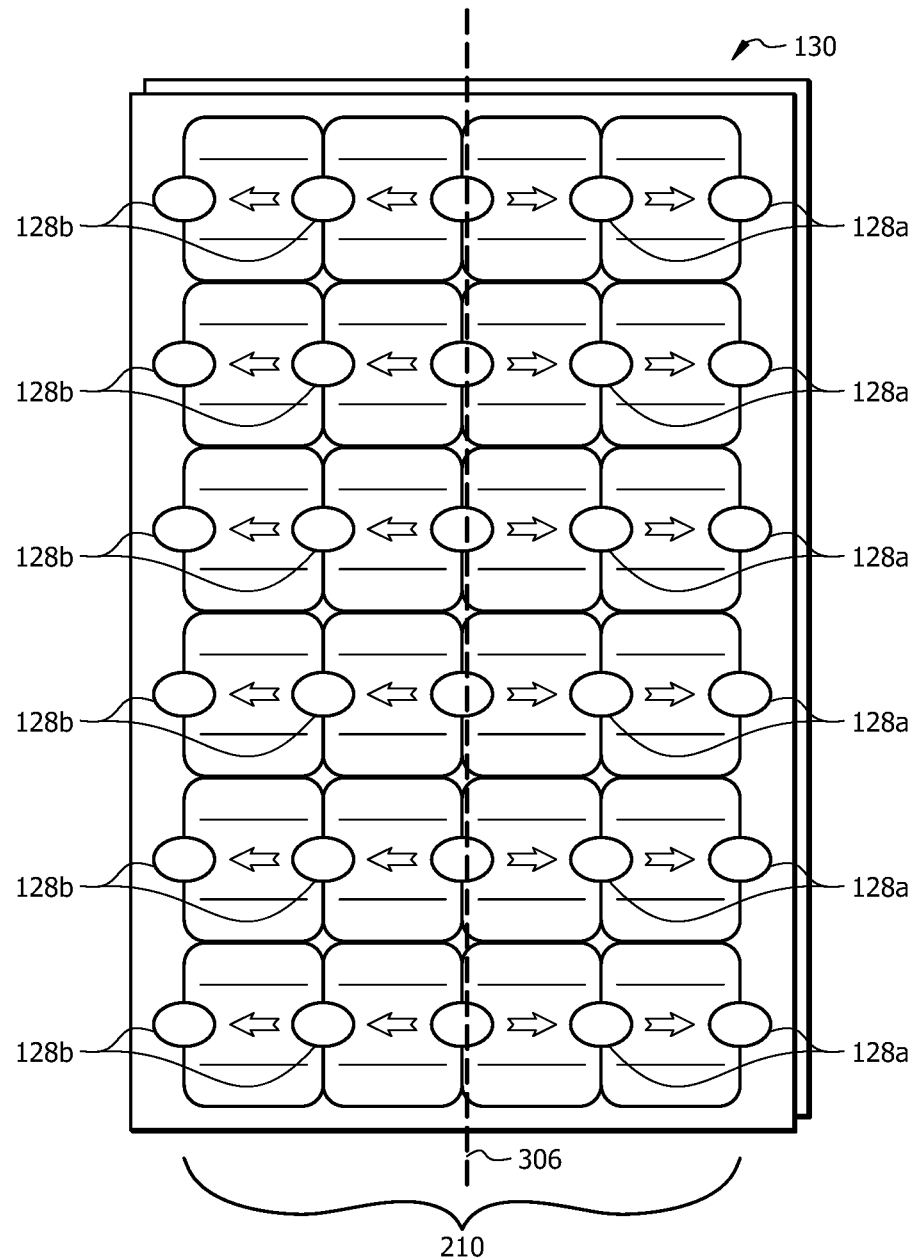
FIG. 2 illustrates an example embodiment of a display screen associated with a computing device of the system of FIG. 1.

The angle sensor circuit 128 may include any hardware processing and angle sensing resources and be configured to detect the angle 150 from which a person or device is viewing the display screen 130 of the computing device 120 relative to the direct/center line of sight to the computing device 120. For example, angle sensor circuit 128 may implement gyroscopes to measure/determine the orientation of the computing device 120, use accelerometers to determine the changes in the positions of the computing device 120, and/or use image processing algorithms (e.g., included in the object detection algorithms 158) to detect peripheral entities in the images 142, their orientation with respect to the orientation of the computing device 120, their position, their line of sight (e.g., front-facing line of sight) with respect to the direct/center line of sight to the computing device 120, etc. Based on the determined data, the angle sensor circuit 128 may determine the angle 150 from which a person or device is viewing the display screen 130 of the computing device 120 relative to the direct/center line of sight to the computing device 120. The direct/center line of sight is shown in FIG. 2.

For example, for a person, the angle sensor circuit 128 may determine a line connecting the eyes of the person and determine an angle 150 between a line between the center of the display screen 130, and calculate the angle this line forms with the direct/center line of sight to the computing device 120. By comparing the position of the person's eyes (detected via the object detection algorithm 158 using the images 142 showing the person) relative to the computing device 120's orientation (determined through gyroscopes and accelerometers), the angle sensor circuit 128 may determine the viewing angle 150 of the person. Likewise, the viewing angle 150 of a device relative to the computing device 120 may be determined. For example, if a device such as a smartphone or camera is detected by the object detection algorithm 158, the angle sensor circuit 128 may determine the orientation of that device's lens or screen relative to the computing device 120, for example, by determining a line from the center of the detected device's lens or screen to the center of the display screen 130 of the computing device 120. The angle formed by this line with the direct/center line of sight of the computing device 120 is then calculated to determine the viewing angle 150 associated with the detected device.

The light sensor circuit 128 may be configured to determine and measure the ambient light (i.e., brightness level 156) in the environment of the computing device 120. For example, the light sensor circuit 128 may use photodetectors, such as photodiodes or phototransistors, that respond to various light intensities. The output from such photodetectors may vary (e.g., increase or decrease) based on the brightness level 156. For example, the output from a photodetector may increase proportionally as the brightness level 156 in the environment of the computing device 120 increases.

The light sensor circuit 128 converts the amount of light (i.e., brightness level 156) it detects into an electrical signal and interprets it to determine the current lighting conditions. For example, in a brightly lit area, the light sensor circuit 128 may register high levels of brightness level 156, which may inform the system 100 that the content on the display screen 130 is visible to potential peripheral entities. The brightness level 156 may be used along with the angle 150 and distance 146 to determine whether to mask the content on the display screen 130. This operation is described in great detail in FIGS. 2-4.

The display screen 130 may be or include a display screen that allows displaying objects (e.g., virtual and/or physical objects). Display screen 130 is configured to present visual information to a user 120a, such as the content in the foreground of the display screen 130. In certain embodiments, the display screen 130 is configured to present visual information to the user. In certain embodiments, display screen 130 is a wearable optical display (e.g., glasses or a headset) configured to reflect projected images and enables a user to see through the display screen 130. In certain embodiments, display screen 130 may comprise display units, lenses, and semi-transparent mirrors embedded in an eyeglass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active-matrix OLED (AMOLED), an organic LED (OLED) display, a projector display, or any other suitable type of display as would be appreciated by one of ordinary skill in the art upon viewing this disclosure. In certain embodiments, display screen 130 is a graphical display on a computing device 120.

In certain embodiments, the display screen 130 may be configured with a multi-layer architecture that allows for differential content display based on the viewing angle 150. This enables the display screen 130 to present the intended content to the user 102a viewing the content from a first direction/angle 150, while displaying altered or masked content to viewers at other directions/angles 150. FIG. 2 illustrates an embodiment of the display screen 130.

Referring to FIG. 2, the display screen 130 comprises a set of pixels 210. Each pixel 210 is associated with a respective set of sensor circuits 128. For example, each sensor 216 is associated with a distance sensor, light sensor, and angle sensor circuits 128. The sensor circuits 128 associated with each pixel 210 may be positioned adjacent to the respective pixel 210. During the process of masking the content on the display screen 130, the splitting algorithm 138 may split the processing task of the pixels on the left and right side of the center line of sight 306 of the display screen 130. The middle pixels may be included in either left or right side pixels 210. The sensor circuits 128a are the sensors associated with the right half pixels 210 and configured to detect when content is viewed from an angle 150 (e.g., at +30 degrees, etc.), which corresponds to a peripheral entity 310a (see FIG. 3) on the right side. In parallel, the sensor circuits 128b are the sensors associated with the left half pixels 210 and configured to detect when content is viewed from angle 150 (e.g., at −30 degrees, etc.) corresponding to a peripheral entity 310b (see FIG. 3) on the left side. In some embodiments, the pixels 210 on both sides may be configured to be masked when viewed from an angle 150 from either side.

Upon detection of a peripheral entity 310 at a specified angle 150, the splitting algorithm 138 initiates a masking protocol to facilitate the masking process for both the right half pixels 210 and the left half pixels 210 simultaneously to mask the content when viewed at the viewing angle 150 of the peripheral entity 310. Thus, in some embodiments, the symmetrical masking process allows the display screen 130 to provide consistent privacy on both sides of the computing device 120 (see FIG. 1). This process is described in greater detail in conjunction with FIGS. 3 and 4.

Referring back to FIG. 1, the memory 132 may be a non-transitory computer-readable medium. The memory 132 may be volatile or non-volatile and may comprise read-only memory (ROM), random-access memory (RAM), ternary content-addressable memory (TCAM), dynamic random-access memory (DRAM), and/or static random-access memory (SRAM). The memory 132 may include one or more of a local database, a cloud database, a network-attached storage (NAS), etc. The memory 132 comprises one or more disks, tape drives, or solid-state drives, and may be used as an over-flow data storage device, to store programs when such programs are selected for execution, and to store instructions and data that are read during program execution. The memory 132 may store any of the information described in FIGS. 1-4 along with any other data, instructions, logic, rules, or code operable to implement the function(s) described herein when executed by processor 122. For example, the memory 132 may store software instructions 134, software application 136, splitting algorithm 138, machine learning algorithm 140, images 142, triggering event 104, object detection algorithm 158, measurement data 144, distance 146, privacy mode 154, training dataset 164, brightness level 156, angle 150, threshold distance 148, threshold angle 152, training dataset 160, training dataset 164, and/or any other data or instructions. The software instructions 134 may comprise any suitable set of instructions, logic, rules, or code operable to execute the processor 122 and perform the functions described herein, such as some or all of those described in FIGS. 1-4.

The software application 136 may be any software, mobile, and/or web application. For example, the software application 136 may be associated with an organization where the user 102a is a member or a client. The user 102a may use their login credentials to access their profile via the software application 136 to, for example, access their documents, information, etc. The privacy mode 154 may be application-specific, e.g., be activated when the software application 136 is accessed on a web browser, mobile application, etc. In other examples, the privacy mode 154 may not be application-specific.

The splitting algorithm 138 may be implemented by the processor 122 executing the software instructions 134, and is generally configured to implement/execute the masking operation associated with the privacy mode 154. For example, the splitting algorithm 138 may be configured to dynamically adjust a first set of pixel output on the display screen 130 based on the detected viewing angles 150 of a peripheral entity 310 (see FIG. 3), distance 146 of the peripheral entity 310 (see FIG. 3), and the brightness level 156 of the environment to execute the masking operation, while maintaining the second set of pixel output unmasked when viewed from other angles 150. Specifically, the splitting algorithm 138 may activate the privacy mode 154 in response to a detected peripheral entity 310 and coordinate the response of each set of the pixels 210 on either side of the center line of sight 306 (see FIG. 2). The operation of the splitting algorithm 138 is described in conjunction with FIGS. 2-4.

The machine learning algorithm 140 may be implemented by the processor 122 executing the software instructions 134, and is generally configured to determine at which angle(s) 150, the content on the display screen 130 to be altered/masked, and at which angle(s) 150 the content does not need to be altered/masked. The machine learning algorithm 140 may be trained by the training dataset 160 to perform its operations. The training dataset 160 may include a set of combinations of distances 146, angles 150, and brightness levels 156, each associated with a respective label of mask or unmask indication 162. For example, the first row entry with a first combination of distance 146a, angle 150a, and brightness level 156a is labeled with a mask indication 162a, and an nth row entry with an nth combination of distance 146n, angle 150n, and brightness level 156n is labeled with a unmask indication 162n. Thus, if it is determined that the current scenario of detected distance 146, angle 150, and brightness level 156, respectively, corresponds to (e.g., is within a threshold range of) each respective distance 146a, angle 150a, and brightness level 156a, the machine learning algorithm 140 may determine that the content on the display screen 130 should be masked when viewed at the angle 150a. Similarly, if the current scenario of detected distance 146, angle 150, and brightness level 156, respectively, corresponds with (e.g., falls within the threshold range of) each of the parameters associated with the nth combination of distance 146n, angle 150n, and brightness level 156n, the machine learning algorithm 140 may determine that the content does not need to be masked when viewed at the angle 150n. In some examples, each row entry of the training dataset 160 may include a range of respective parameters, e.g., in the first row entry, the distance 146a may be a first distance range, the angle 150a may be a first angle range, and the brightness level 156a may be a first brightness level range. Similarly, in the nth row entry, the distance 146n may be the nth distance range, the angle 150n may be the nth angle range, and the brightness level 156n may be the nth brightness level range.

The triggering event 104 may comprise a user interaction with the software application 136 on the display screen 130 (such as when the software application 136 is accessed, login credentials are provided, etc.), detecting that a web browser associated with the software application 136 is accessed, and a kiosk (e.g., an ATM where the privacy mode 154 is implemented) is accessed (e.g., a pin number is entered into the ATM, a device is slid inside the ATM, etc.).

The object detection algorithm 158 may be implemented by the processor 122 executing the software instructions 134, and is generally configured to detect objects within a field of view of the camera 126. For example, the images 142 of the field of view of the camera 126 may be fed to the object detection algorithm 158. In response, the object detection algorithm 158 may identify and classify objects shown in the image 142 and distinguish between the user 102a and potential peripheral entities 310 (see FIG. 3). In some embodiments, the object detection algorithm 158 may comprise a support vector machine, neural network, random forest, k-means clustering, facial recognition algorithm, etc. The object detection algorithm 158 may be implemented by a plurality of neural network (NN) layers, convolutional NN (CNN) layers, Long-Short-Term-Memory (LSTM) layers, Bi-directional LSTM layers, recurrent NN (RNN) layers, and the like.

The object detection algorithm 158 may differentiate various objects by analyzing shapes, sizes, movement patterns, and other distinguishing features of the objects shown in the image feed or video feed comprising a series of images 142. The object detection algorithm 158 may be trained by a training dataset 164. The training dataset 164 may include images of objects (e.g., user 102a, other authorized users 102a who are indicated in a profile of the user 102a at the software application 136, devices, cameras, mobile devices, etc.), where each image is labeled with the object shown in the image. Upon detecting a human figure or a device, the object detection algorithm 158 may determine the position, distance 146 of the detected entity from the computing device 120 orientation, and viewing angle 150 of the detected entity with respect to the computing device 120, for example, in conjunction with the sensor circuits 128, similar to that described above. This information may be used in conjunction with the sensor output determined by the sensor circuits 128 to whether to mask the content when viewed from the angle 150, similar to that described above and FIGS. 3 and 4.

In addition, the object detection algorithm 158 may include facial recognition algorithm to determine whether the user 102a (or other people) is authorized to view the content associated with the software application 136 by extracting facial features of the detected person, comparing the extracted facial features with the facial features of the authorized users indicated in the profile of the user 102a associated with the software application 136. This operation is described in great detail in FIG. 3.

Figure 3:
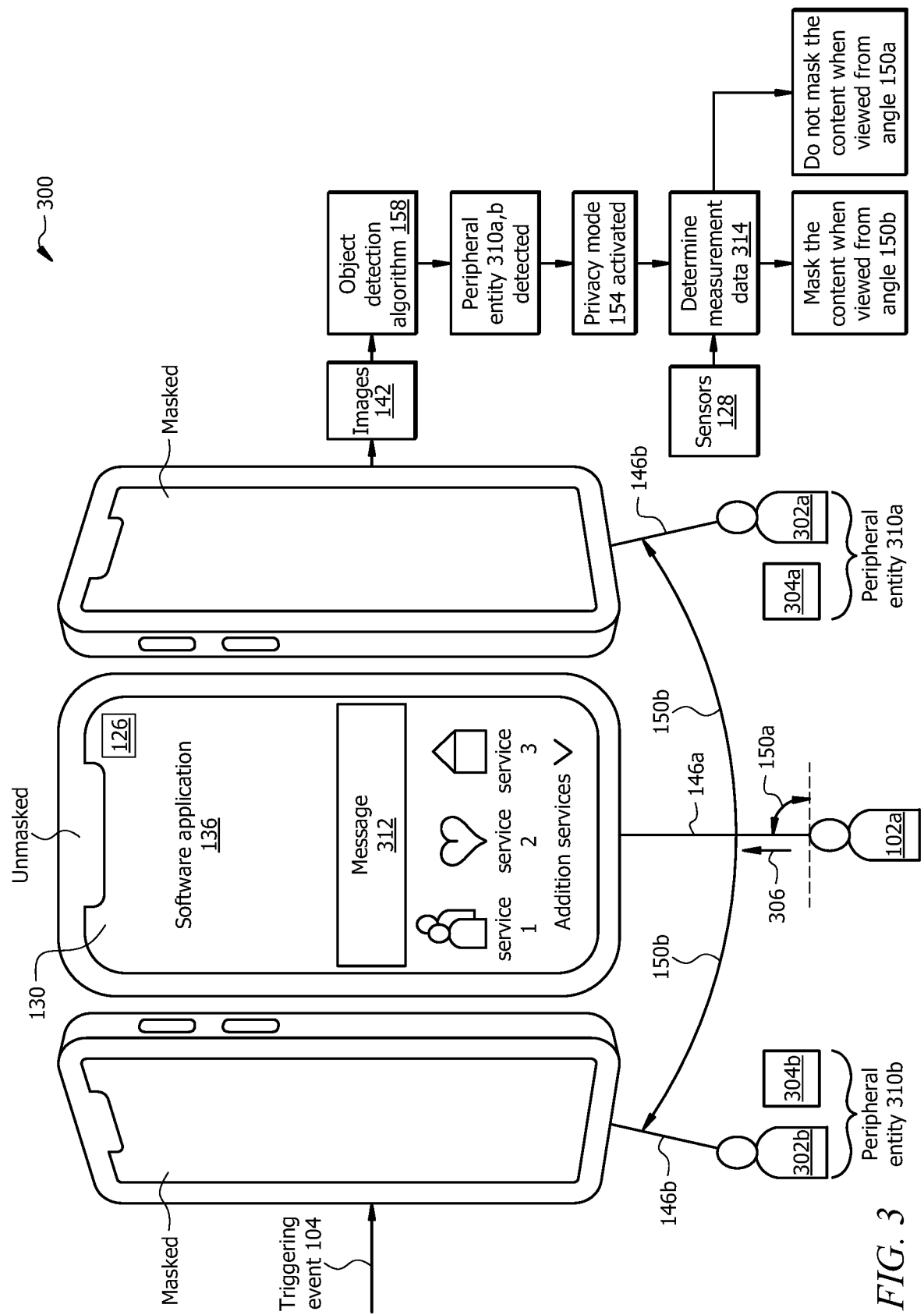
FIG. 3 illustrates an example operational flow of the system 100 of FIG. 1.

Operational Flow for Masking Content Displayed on the Display Screen Based on Proximity and Viewing Angle FIG. 3 illustrates an example operational flow 300 of the system 100 (see FIG. 1) for masking the content displayed on the display screen 130 of the computing device 120 based on the proximity (e.g., distance 146), viewing angle 150, and brightness level 156. In one example of FIG. 2, assume that the user 102a is authorized to access a profile on the software application 136, and the users 102b are not.

In operation, the operational flow 300 may begin when the computing device 120 detects a triggering event 104. The triggering event 104 may include an interaction of the user 102a with the software application 136, a web browser associated with the software application 136 being accessed, or an ATM (in an example where the computing device 120 is the ATM) being accessed.

Detecting a Peripheral Entity

In some embodiments, upon detecting the triggering event 104, the computing device 120 may trigger the camera 126 to determine whether any peripheral entity 310a, 310b is present in an image 142 captured by the camera 126. For example, the processor 122 (see FIG. 1) of the computing device 120 may send an instruction message to the camera 126 to capture images 142. The processor 122 may feed the captured images 142 to the object detection algorithm 158.

The object detection algorithm 158 may determine the presence of the peripheral entity 310*a*, 310*b* in the image 142, based on the shape, size, orientation, speed, movements, and other physical features of the peripheral entity 310*a*, 310*b*. The peripheral entity 310*a* may include the user 302*a* and/or device 304*a* at the right side of the center line of sight 306, and the peripheral entity 310*b* may include the user 302*b* and/or device 304*b* on the left side of the center line of sight 306 to the display screen 130. Thus, in some embodiments, detecting the presence of the peripheral entity 310*a*, 310*b* may be in response to receiving the images 142 from the camera 126 and detecting by the object detection algorithm 158 that the peripheral entity 310*a*, 310*b* is shown in an image 142.

In some embodiments, the computing device 120 may determine whether the user 102*a* is authorized to access the profile on the software application 136. For example, the computing device 120 may receive the login credentials entered into the software application 136 and determine whether the login credentials are correct, i.e., match the previously saved login credentials. In another example, the computing device 120 may use a facial recognition algorithm (included in the object detection algorithm 158) to extract facial features of the user 102*a* and determine whether the extracted facial features correspond to an authorized user's facial data stored the profile of the user 102*a*. If the facial recognition algorithm confirms the identity of the user 102*a* as an authorized user, access to the profile on the software application 136 is granted. Otherwise, the facial recognition algorithm may prevent access to the profile on the software application 136. In this case, the computing device 120 may mask the content when viewed by the angle 150 of the unauthorized user.

In the example of FIG. 3, the computing device 120 may determine that the peripheral entity 310*a*, 310*b* is detected and is not authorized to view the content on the software application 136 that is displayed on the display screen 130. In case the peripheral entity 310*a*, 310*b* is the user 302*a*, 302*b* (referred to herein as user 302), the computing device 120 may determine that the user 302 is not authorized to view the software application 136. To this end, the computing device 120 may capture the image 142 of the user 302 using the camera 126 and via the object detection algorithm 158 extract a first set of facial features associated with the user 302 from the image 142 using the facial recognition algorithm. The facial features may include shapes and positions of the eyes, nose, mouth, jawline, eyebrows, facial hair, etc., of the user 302 and be represented in a first feature vector.

The object detection algorithm 158 may access the historical records of the set of authorized users indicated in the profile of the authorized user 102*a* and perform a similar operation for each of them. For example, the object detection algorithm 158 may extract a second set of facial features associated with each authorized user, where the second set of facial features may include shapes and positions of the eyes, nose, mouth, jawline, eyebrows, facial hair, etc., of the respective authorized user and be represented in a second feature vector. The object detection algorithm 158 may compare the first feature vector (e.g., the first set of extracted facial features) with the second feature vector (e.g., the second set of extracted facial features), respectively.

The object detection algorithm 158 may determine that the first feature vector (e.g., the first set of extracted facial features) does not correspond to the second feature vector (e.g., the second set of extracted facial features), respectively. In other words, the object detection algorithm 158 may determine that facial features of the user 302 do not correspond to any facial feature associated with any authorized user. Thus, the object detection algorithm 158 may determine that the user 302 is not among the authorized users and is not authorized to view the software application 136.

Activating the Privacy Mode

In some embodiments, the computing device 120 may display a message on the display screen 130 asking whether to activate a location-based security service. In some embodiments, when the location-based security service is activated, the computing device 120 may determine the GPS location of the computing device 120, and if it is determined that the computing device 120 is in a crowded area (e.g., an area that historically more than a threshold number of people are detected (e.g., more than five people per square feet, etc.), the computing device 120 may display a message 312 on the display screen 130 asking whether to enable the privacy mode 154.

In some embodiment, if the user 102*a* provides a user input to activate the location-based security service, the computing device 120 may perform the operation associated with this service as described herein. Otherwise, the computing device 120 may not activate this service.

In some embodiments, the computing device 120 may display the message 312 asking whether to enable the privacy mode 154 in response to the detection of the triggering event 104, in response to detecting that the computing device 120 is in a crowded area, and/or in response to a detection of a peripheral entity 310*a*,*b* in an image 142.

In some embodiments, in the privacy mode 154, the content displayed on the display screen 130 is masked when viewed from the angle 150 associated with the peripheral entity 310*a*, 310*b* in response to detecting the peripheral entity 310*a*,310*b* within the threshold distance 148 from the computing device 120 and detecting that the viewing angle 150 from which the peripheral entity 130*a*, 130*b* is viewing the display screen 130 relative to the center line of sight 306 to the display screen 130 is less than the threshold angle 152. The user 102*a* may provide a user input that indicates to activate the privacy mode 154. In response to receiving the user input to activate the privacy mode 154, the computing device 120 may perform the operations described below.

Altering the Content on the Display Screen when Viewed from the Determined Angle In some embodiments, the computing device 120 may activate the sensor circuits 128 to determine a set of measurement data 314, where the measurement data 314 includes the distance 146*b* from the user 302*b* to the computing device 120, the angle 150*b* from which the user 302*b* is viewing the display screen 130 relative to the center direct line of sight 306 to the display screen 130, and the brightness level 156 of the environment of the computing device 120. The processor of the computing device 120 may receive the measurement data 314 from the sensor circuits 128. For example, the computing device 120 may receive the distances 146*b* from the distance sensor circuits 128, the angles 150*b* from the angle sensor circuits 128, and the brightness level 156 from the light sensor circuit 128. The processor of the computing device 120 may feed the measurement data 314 to the machine learning algorithm 140.

The machine learning algorithm 140 that is trained on the training dataset 160 that includes various parameters such as distances 146, angles 150, brightness levels 156, and the corresponding mask or unmask indication 162 may analyze the measurement data 314 to determine whether to mask the content on the display screen 130 when viewed from the angle 150b and from distance 146b. For example, if the combination of the current scenario of combination of angle 150b, distance 146b, and brightness level 156b corresponds to a set of parameters in a row entry of the training dataset 160, respectively, (e.g., each of the parameters in the current scenario is within a respective threshold range of a counterpart parameter in the row entry that is associated with a mask indication 162), the machine learning algorithm 140 may determine that the content on the display screen 130 should be masked when viewed from the angle 150b and from distance 146b or less. For example, assume that the training dataset 160 contains a particular row entry with a set of parameters where the screen content is recognizable and should be masked at a distance 146b of up to five feet and an angle 150b of up to 30 degrees under certain brightness conditions, and the current conditions correspond to this scenario, the content may be masked when viewed at 30 degrees with a margin angle. The machine learning algorithm 140 compares the current scenario of detected distance 146b, angle 150b, and brightness level 156, with each row entry in the training dataset 160 and determines that the particular row entry comprises a set of parameters that correspond to the set of detected parameters of the current conditions, respectively. Thus, in this example, if the peripheral entity 310a, 310b attempts to view the display screen 130 from a distance 146b of five feet or less and at an angle 150b of 30 degrees with a margin angle (optionally under the specified brightness within a threshold range of the current brightness level 156), the peripheral entity 310a, 310b may not be able to observe or view the content because at least one level of the content display is masked by the computing device 120 when viewed at the angle 150b with a margin angle.

In this process, in some embodiments, the computing device 120 may determine that the distance 146b between the peripheral entity 310a, 310b is less than the threshold distance 148. The threshold distance 148 may be determined to be a minimum distance to the computing device 120 from where the content on the display screen 130 is recognizable (depending on the content, such as font size, etc.).

The computing device 120 may also determine that the angle 150b from which the user 302b is viewing the display screen 130 relative to the center direct line of sight 306 to the display screen 130 is less than the threshold angle 152. The threshold angle 152 may be determined such that when the angle between the face of the peripheral user 302 and/or the camera lens of the peripheral device 304 is less than the threshold angle 152, the content displayed on the display screen 130 is recognizable.

In response to the determination that the current scenario (i.e., the peripheral entity 310a, 310b is at distance 146b from the computing device 120, with viewing angle 150b, under the brightness level 156) corresponds to a row entry in the training dataset 160 that is associated with a mask indication 162 and/or within a threshold range of the respective parameters in the row entry associated with the mask indication 162 and/or that the distance 146b between the peripheral entity 310a, 310b is less than the threshold distance 148 and/or that the angle 150b from which the user 302b is viewing the display screen 130 relative to the center direct line of sight 306 to the display screen 130 is less than the threshold angle 152, the computing device 120, e.g., via the splitting algorithm 138 may mask the content on the display screen 130 when viewed from the angle 150b. For example, the content associated with the software application 136 may be masked. The position, orientation, distance 146b from the computing device 120, viewing angle 150b, and the brightness level 156 may be tracked to update or maintain the pixel output of the display screen 130 for the peripheral entity 310a, 310b.

The computing device 120 may add an angle margin range (e.g., ±10 degrees, etc.) to either side of the viewing angle 150b of the peripheral entity 310a, 310b for the masking process to account for movements or shifts in the viewing position of the peripheral entity 310a, 310b. Similarly, the computing device may add a distance margin range (e.g., ±one foot, etc.) to either side of the viewing distance 146b of the peripheral entity 310a, 310b for the masking process to account for movements or shifts in the position of the peripheral entity 310a, 310b.

In some embodiments, masking the content may include reducing the brightness of the display screen 130, blurring the content, and any other masking technique to make the content unrecognizable when viewed from the angle 150b.

The splitting algorithm 138 may cause a first set of the pixels of a first layer of the display screen 130 on left and right sides of the center direct line of sight 306 to alter the content being displayed such that when viewed from the designated angle 150b (from either left or right side) and distance 146b, the content appears fragmented or unrecognizable (e.g., blurred or dimmed), similar to that described in FIG. 2. However, for the authorized user 102a viewing the display screen 130 at an angle 150a, the second of pixels of the second layer of the display screen 130 on left and right sides of the center line of sight 306 are not altered and the content remains unmasked/unaltered. In some embodiments, any number of content layers may be masked for any number of peripheral entities 310a, 310b.

For example, the computing device 120, e.g., via the splitting algorithm 138 may employ a display mechanism of the display screen 130 where each screen segment, comprised of multiple pixels, is configured to present distinct content based on the viewer's angle. When the computing device 120 identifies a peripheral entity 310a, 310b viewing from the angle 150b, a first set of pixels within these segments (on a first display layer) may be activated to display masked content directed towards angle 150b. Concurrently, another set of pixels (on a second display layer) may be configured to show the unmasked content towards angle 150a, the viewing angle of the authorized user 102a. The layers of the display screen 130 may be adjacent to each other on the surface of screen 130. For example, the computing device 120, e.g., via the splitting algorithm 138 and display screen 130 may employ micro-optic elements or similar technologies with the pixels or groups thereof, to enable the directional control of light emission and/or pixel orientation.

Figure 4:
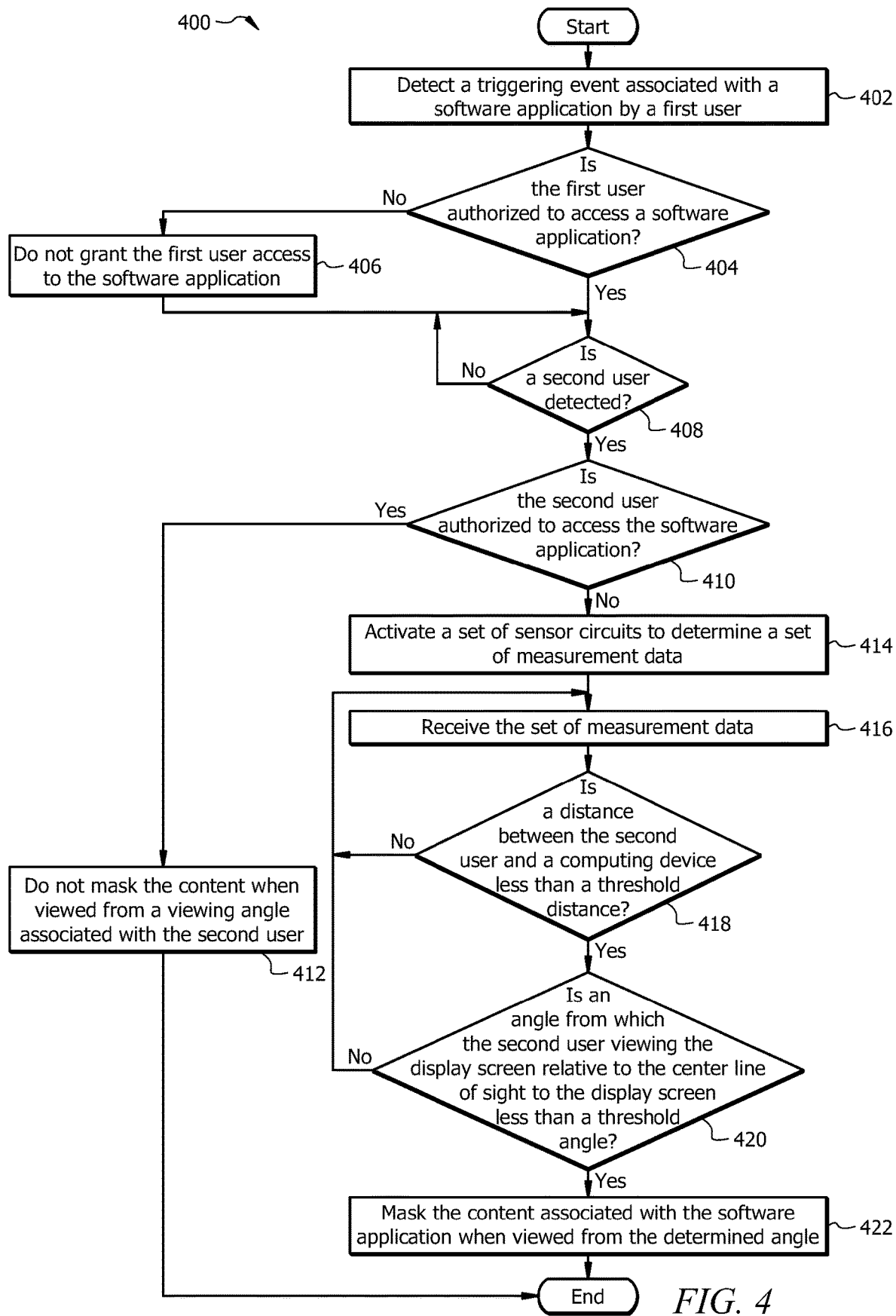
FIG. 4 illustrates an example flowchart of a method to protect data associated with a user from unauthorized users/devices.

Example Method for Masking Content Displayed on the Display Screen Based on Proximity and Viewing Angle FIG. 4 illustrates an example flowchart of a method 400 for masking content displayed on the display screen 130 based on proximity and viewing angle of a viewer, according to some embodiments. Modifications, additions, or omissions may be made to method 400. Method 400 may include more, fewer, or other operations. For example, operations may be performed in parallel or in any suitable order. While at times it is discussed that the system 100, computing devices 120, or components of any of thereof perform some operations, any suitable system or components of the system may perform one or more operations of the method 400. For example, one or more operations of method 400 may be implemented, at least in part, in the form of software instructions 134 of FIG. 1, stored on a tangible non-transitory machine-readable medium (e.g., memory 132 of FIG. 1) that when run by one or more processors (e.g., processor 122 of FIG. 1) may cause the one or more processors to perform operations 402-422.

At operation 402, the computing device 120 detects a triggering event 104 associated with the software application 136 by the first user 102a. For example, the computing device 120 may detect that the first user 102a has accessed/opened the software application 136, opened a web browser of the software application 136, initiated an operation at an ATM (in the example where the computing device 120 is an ATM), etc.

At operation 404, the computing device 120 determines whether the first user 102a is authorized to access the software application 136. For example, the computing device 120 may evaluate the login credentials, pin number, etc. provided by the first user 102a to access a profile via the software application 136. In another example, the computing device 120 may use facial recognition algorithm to verify whether the first user 102a is among the authorized users indicated in the profile on the software application 136, similar to that described in FIGS. 1 and 3. If the computing device 120 determines that the first user 102a is authorized to access the software application 136, the method 400 proceeds to operation 408. Otherwise, the method 400 proceeds to operation 406. At operation 406, the computing device 120 does not grant the first user 102a access to the software application 136.

At operation 408, the computing device 120 determines whether a second user 302 (e.g., either or both users 302a and 302b in FIG. 3) detected. For example, the computing device 120 determines whether the second user 302 is present in an image 142 captured by the camera 126, via the facial recognition algorithm, similar to that described in FIGS. 1 and 3. Although, certain operations are described with respect to the second user 302. As described in FIG. 3, similar operations may be performed with respect to a peripheral device 304 (e.g., peripheral device(s) 304a, 304b in FIG. 3). For example, the term second user 302 may be replaced with the term peripheral entity 310 (e.g., peripheral entity 310a, 310b in FIG. 3) herein. If it is determined that the second user 302 is present in the image 142 (e.g., frame) captured by the camera 126, the computing device 120 may determine that the second user 302 is detected. In response, the method 400 proceeds to operation 410. Otherwise, the method 400 may continue to monitor the images 142 captured by the camera 126 to determine whether a new peripheral user 302/device 304 comes within a field of view of the camera 126 and shows in a captured image 142.

At operation 410, the computing device 120 determines whether the second user 302 is authorized to access the software application 136. For example, the computing device 120 may implement the facial recognition algorithm to verify whether the second user 302 is among the authorized users indicated in the profile associated with the first user 102a on the software application 136, similar to described in FIGS. 1 and 3. If it is determined that the second user 302 is not among the authorized users, the computing device 120 may determine that the second user 302 is not authorized to access/view the software application 136. In response, the method 400 may proceed to operation 414. Otherwise, the method 400 may proceed to operation 412.

At operation 412, the computing device 120 does not mask the content associated with the software application 136 when viewed from a viewing angle 150 associated with the second user 302. For example, the computing device 120 may cause a first set of pixels to display unmasked/unaltered content toward the direction of viewing angle 150, similar to that described in FIGS. 1 and 3. The computing device 120 may perform a similar operation and not mask the content associated with the software application 136 when viewed from the viewing direction/angle 150 associated with any authorized user 102a after the first user 102a is authenticated at operation 404.

At operation 414, the computing device 120 activates a set of sensor circuits 128 to determine a set of measurement data 314. For example, the processor 122 of the computing device 120 may send an instruction message that indicates to determine the measurement data 314 to the sensor circuits 128. In response, the sensor circuits 128 determine the respective measurement data 314, similar to that described in FIGS. 1 and 3. At operation 416, the computing device 120 receives the set of measurement data 314 from the sensor circuits 128.

At operation 418, the computing device 120 determines whether a distance 146b between the second user 302 and the computing device 120 is less than a threshold distance 148. If it is determined that the distance 146 is less than the threshold distance 148, the method 400 proceeds to operation 420. Otherwise, the computing device 120 may return to operation 416 to continue to track and monitor the movements of the second user 302 while still within the field of view of the camera 126 by tracking the movements of the second user 302 from the video/images 142 captured by the camera 126. In some embodiments, the sensor circuits 128 may include the camera 126, and the measurement data 314 may include the images 142 for tracking the movement, position, distance 146b, angle 150b associated with the second user 302 in the images 142, and the brightness level 156.

At operation 420, the computing device 120 determines whether an angle 150b from which the second user 302 is viewing the display screen 130 relative to the center line of sight 306 to the display screen 130 is less than a threshold angle 152. If it is determined that the angle 150b is less than the threshold angle 152, the method 400 may proceed to operation 422. For example, in such a case, the computing device 120 may determine that the content displayed on the display screen 130 is recognizable when viewed from the distance 146b and angle 150b. In some embodiments, the computing device 120 may compare the combination of the current combination of parameters, including angle 150b, distance 146b, and brightness level 156 with a combination in each row entry of the training dataset 160, where each parameter in the current combination is compared to the counterpart parameter in each row entry. Thus, the computing device 120 may use the mask/unmask indication 162 of a corresponding row entry to determine whether the content should be masked for the current combination of parameters, including angle 150b, distance 146b, and brightness level 156. If it is determined that angle 150b is not less than the threshold angle 152, the method 400 may return to operation 416 to continue to monitor and track the movement, position, distance 146b, angle 150b, and brightness level 156.

At operation 422, the computing device 120 masks the content associated with the software application 136 when viewed from the determined angle 150b. For example, the computing device 120 may blur, reduce the brightness level of the display screen 130.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for protecting data associated with a software application from unauthorized users, comprising:
a camera configured to capture images of a space in front of a computing device; and
a processor associated with the computing device, operably coupled to the camera, and configured to:
detect a triggering event, wherein the triggering event comprises an interaction of a first user with a software application on a display screen of the computing device;
detect a presence of a second user on an image captured by the camera;
determine that the second user is not authorized to view the software application displayed on the display screen;
in response to determining that the second user is not authorized to view the software application displayed on the display screen:
activate a set of sensor circuits to determine a set of measurement data, wherein:
each sensor of the set of sensor circuits is configured to determine a respective measurement data;
the set of sensor circuits comprises a distance sensor circuit and an angle sensor circuit;
the set of measurement data comprises a distance between the second user and the computing device, and an angle from which the second user is viewing the display screen relative to a center line of sight to the display screen;
receive the set of measurement data from the set of sensor circuits;
determine that the distance between the second user and the computing device is less than a threshold distance;
determine that the angle from which the second user is viewing the display screen relative to the center line of sight to the display screen is less than a threshold angle, wherein the threshold angle is determined such that when the angle between a face of the second user and the display screen is less than the threshold angle, content displayed on the display screen is recognizable by the second user;
in response to determining that the distance between the second user and the computing device is less than the threshold distance and that the angle from which the second user is viewing the display screen relative to the center line of sight to the display screen is less than the threshold angle, mask the content associated with the software application that is displayed on the display screen when viewed from the determined angle.

2. The system of claim 1, wherein masking the content associated with the software application that is displayed on the display screen when viewed from the determined angle comprises one of the following:
reducing brightness of the display screen; or
blurring the content.

3. The system of claim 1, wherein detecting the triggering event comprises detecting that a web browser associated with the software application is accessed.

4. The system of claim 1, wherein activating the set of sensor circuits is further in response to:
displaying, on the display screen, a message that indicates whether to activate a privacy mode, wherein in the privacy mode, the content displayed on the display screen is masked in response to detecting a user within the threshold distance from the computing device and detecting that the angle from which the user is viewing the display screen relative to the center line of sight to the display screen is less than the threshold angle;
receiving a user input that indicates to activate the privacy mode.

5. The system of claim 1, wherein detecting the presence of the second user on the image captured by the camera is in response to:
receiving the image from the camera; and
detecting, by an object detection algorithm, that the second user is shown in the image.

6. The system of claim 1, wherein:
the distance sensor circuit is configured to detect the distance between the first user and the computing device; and
the angle sensor circuit is configured to detect the angle from which the second user is viewing the display screen relative to the center line of sight to the display screen.

7. The system of claim 1, wherein determining that the second user is not authorized to view the software application is in response to:
capturing an image of the second user using the camera;
extracting a first facial feature associated with the second user from the captured image;
accessing a historical record of a set of authorized users indicated in a profile of the first user;
for each authorized user from the set of authorized users:
comparing the first extracted facial feature associated with the second user with a second facial feature associated with the authorized user; and
based at least in part upon the comparison:
determining that the first extracted facial feature associated with the second user does not correspond to any facial feature associated with the set of authorized users; and determining that the second user is not among the set of authorized users.

8. A method for protecting data associated with a software application from unauthorized users, comprising:
   detecting a triggering event, wherein the triggering event comprises an interaction of a first user with a software application on a display screen of a computing device;
   detect a presence of a second user on an image captured by a camera;
   determining that the second user is not authorized to view the software application displayed on the display screen;
   in response to determining that the second user is not authorized to view the software application displayed on the display screen:
      activating a set of sensor circuits to determine a set of measurement data, wherein:
         each sensor of the set of sensor circuits is configured to determine a respective measurement data;
         the set of sensor circuits comprises a distance sensor circuit and an angle sensor circuit;
         the set of measurement data comprises a distance between the second user and the computing device, and an angle from which the second user is viewing the display screen relative to a center line of sight to the display screen;
      receiving the set of measurement data from the set of sensor circuits;
      determine that the distance between the second user and the computing device is less than a threshold distance;
      determining that the angle from which the second user is viewing the display screen relative to the center line of sight to the display screen is less than a threshold angle, wherein the threshold angle is determined such that when the angle between a face of the second user and the display screen is less than the threshold angle, content displayed on the display screen is recognizable by the second user;
      in response to determining that the distance between the second user and the computing device is less than the threshold distance and that the angle from which the second user is viewing the display screen relative to the center line of sight to the display screen is less than the threshold angle, masking the content associated with the software application that is displayed on the display screen when viewed from the determined angle.

9. The method of claim 8, wherein masking the content associated with the software application that is displayed on the display screen when viewed from the determined angle comprises one of the following:
   reducing brightness of the display screen; or
   blurring the content.

10. The method of claim 8, wherein detecting the triggering event comprises detecting that a web browser associated with the software application is accessed.

11. The method of claim 8, wherein activating the set of sensor circuits is further in response to:
   displaying, on the display screen, a message that indicates whether to activate a privacy mode, wherein in the privacy mode, the content displayed on the display screen is masked in response to detecting a user within the threshold distance from the computing device and detecting that the angle from which the user is viewing the display screen relative to the center line of sight to the display screen is less than the threshold angle; and
   receiving a user input that indicates to activate the privacy mode.

12. The method of claim 8, wherein detecting the presence of the second user on the image captured by the camera is in response to:
   receiving the image from the camera; and
   detecting, by an object detection algorithm, that the second user is shown in the image.

13. The method of claim 8, wherein:
   the distance sensor circuit is configured to detect the distance between the first user and the computing device; and
   the angle sensor circuit is configured to detect the angle from which the second user is viewing the display screen relative to the center line of sight to the display screen.

14. The method of claim 8, wherein determining that the second user is not authorized to view the software application is in response to:
   capturing an image of the second user using the camera;
   extracting a first facial feature associated with the second user from the captured image;
   accessing a historical record of a set of authorized users indicated in a profile of the first user;
   for each authorized user from the set of authorized users:
      comparing the first extracted facial feature associated with the second user with a second facial feature associated with the authorized user; and
   based at least in part upon the comparison:
      determining that the first extracted facial feature associated with the second user does not correspond to any facial feature associated with the set of authorized users; and
      determining that the second user is not among the set of authorized users.

15. A non-transitory computer-readable medium storing instructions that, when executed by a processor, cause the processor to:
   detect a triggering event, wherein the triggering event comprises an interaction of a first user with a software application on a display screen of a computing device;
   detect a presence of a second user on an image captured by a camera;
   determine that the second user is not authorized to view the software application displayed on the display screen;
   in response to determining that the second user is not authorized to view the software application displayed on the display screen:
      activate a set of sensor circuits to determine a set of measurement data, wherein:
         each sensor of the set of sensor circuits is configured to determine a respective measurement data;
         the set of sensor circuits comprises a distance sensor circuit and an angle sensor circuit;
         the set of measurement data comprises a distance between the second user and the computing device, and an angle from which the second user is viewing the display screen relative to a center line of sight to the display screen;
      receive the set of measurement data from the set of sensor circuits;
      determine that the distance between the second user and the computing device is less than a threshold distance;
      determine that the angle from which the second user is viewing the display screen relative to the center line of sight to the display screen is less than a threshold angle, wherein the threshold angle is determined such that when the angle between a face of the second user and the display screen is less than the threshold angle, content displayed on the display screen is recognizable by the second user;

in response to determining that the distance between the second user and the computing device is less than the threshold distance and that the angle from which the second user is viewing the display screen relative to the center line of sight to the display screen is less than the threshold angle, mask the content associated with the software application that is displayed on the display screen when viewed from the determined angle.

16. The non-transitory computer-readable medium of claim 15, wherein masking the content associated with the software application that is displayed on the display screen when viewed from the determined angle comprises one of the following:

reducing brightness of the display screen; or blurring the content.

17. The non-transitory computer-readable medium of claim 15, wherein detecting the triggering event comprises detecting that a web browser associated with the software application is accessed.

18. The non-transitory computer-readable medium of claim 15, wherein activating the set of sensor circuits is further in response to:

displaying, on the display screen, a message that indicates whether to activate a privacy mode, wherein in the privacy mode, the content displayed on the display screen is masked in response to detecting a user within the threshold distance from the computing device and detecting that the angle from which the user is viewing the display screen relative to the center line of sight to the display screen is less than the threshold angle;

receiving a user input that indicates to activate the privacy mode.

19. The non-transitory computer-readable medium of claim 15, wherein detecting the presence of the second user on the image captured by the camera is in response to:

receiving the image from the camera; and detecting, by an object detection algorithm, that the second user is shown in the image.

20. The non-transitory computer-readable medium of claim 15, wherein the instructions further cause the processor to determine that the first user is authorized to access the software application based at least in part upon a login credential used to access the software application.

* * * * *